Dec. 30, 1969    R. J. KERN ETAL    3,486,335
COMMON VALVE PLATE HYDROSTATIC TRANSMISSION
Filed Oct. 2, 1967
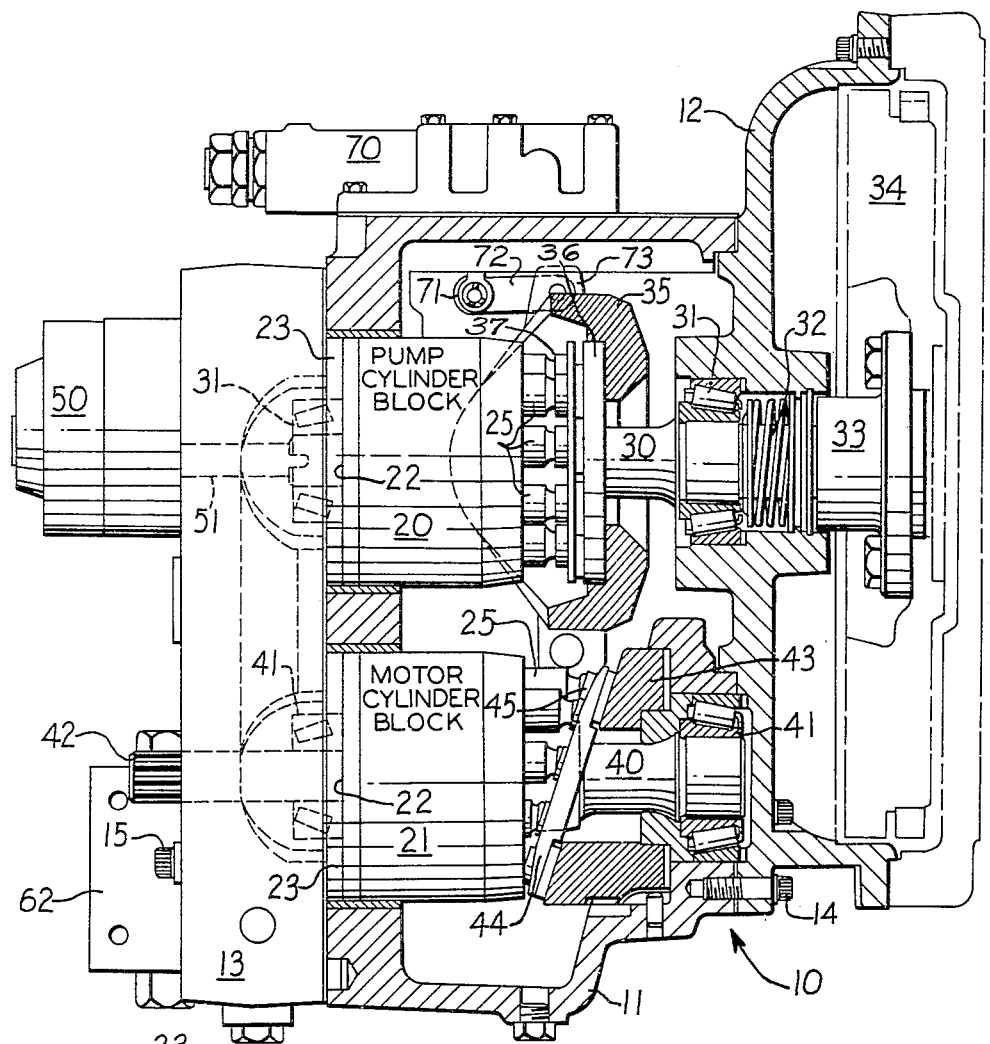
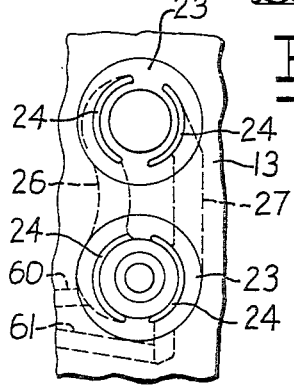
INVENTORS
RICHARD J. KERN
ERNEST C. SWEIGERT
BY Freyer, Tjensvold, Feix, Phillips & Lempio
ATTORNEYS United States Patent Office 3,486,335
Patented Dec. 30, 1969

3,486,335
COMMON VALVE PLATE HYDROSTATIC TRANSMISSION
Richard J. Kern and Ernest C. Sweigert, Euclid, Ohio, assignors to Towmotor Corporation, Cleveland, Ohio, a corporation of Ohio
Filed Oct. 2, 1967, Ser. No. 672,161
Int. Cl. F16d *31/02;* F04b *1/10*
U.S. Cl. 60—53                 1 Claim

ABSTRACT OF THE DISCLOSURE

A compact, common case hydrostatic transmission can be fabricated by mounting both the cylinder blocks of the pump and motor units adjacent to one another in a side-by-side relationship on a single valve plate with an internal manifold connecting the kidney-shaped ports cooperating with the respective cylinder blocks, thereby eliminating the need for external fittings, piping and reducing the effects of distortion resulting from high pressures and temperatures. In addition, auxiliary components may be conveniently driven by a direct couple to the transmission input shaft driving the pump unit.

BACKGROUND OF THE INVENTION

Hydrostatic transmissions are becoming increasingly popular in work vehicles, such as tractors, and find specific applicability in lift trucks where creeping or inching movement is required to accurately position the vehicle with reference to a load. These transmissions often employ axial-piston-type units for pump and motor units which are connected in a fluid loop system so that power flow may be interchanged between these units by fluid pressure and flow. Normally, the displacement of the pump unit is variable so that the transmission can run at relatively high input speed with variable output speeds which offers an indefinite range of speeds within the designed transmission speed range. Such advantages are particularly desirable in lift trucks and the ability to run the engine at a constant high r.p.m. allows the engine to drive the auxiliary components, such as pumps powering the lift forks, at higher speeds, thereby improving the overall efficiency of the lift truck.

Many other advantages are afforded by hydrostatic transmission over the use of gears and clutches and/or torque converters, such as infinite speed range, instant response to control adjustment and elimination of friction element and accompanying maintenance due to wear.

Hydrostatic transmissions may be composed of separate pump and motor units which are connected in a fluid or hydrostatic loop with external piping and fittings. An example of such coupled units is shown in U.S. Patent No. 2,872,876 issued to Thoma which employs special conduits and fittings for connecting the separate pump and motor units. In U.S. Patent 924,787, issued to Janney, the pump and motor units are mounted coaxially with one another, end to end, in a composite unit.

Since pressures in the range of 3 to 5000 p.s.i. or greater are often encountered in the hydrostatic loops of such transmissions, along with fairly high temperatures, there are serious problems encountered in connecting the separate pump and motor units together with external fittings and pipings or in joining the units endwise as shown in the above Janney patent. Not only are there problems with leakage and distortion (both pressure and thermal) in such conventional units but also there are the problems in keeping the units compact, since complicated conduits required for joining separate pump and motor units, are quite bulky, and joining of the units endwise present special problems in maintaining proper clearance and require the unit to be unusually long axially.

By the novel design for a hydrostatic transmission described herein, many of the above difficulties are eliminated or substantially reduced and the size of the transmission unit can be appreciably reduced. The compactness of the unit according to this invention makes it well suited for lift trucks and the like where space is at a premium due to the design of the vehicle.

SUMMARY OF THE INVENTION

An improved hydrostatic transmission having a fluid pump and a fluid motor, according to this invention, can be fabricated by mounting both the cylinder blocks of the pumping unit and motor unit in a side-by-side relationship on a common valve plate structure having an internal or built-in manifold for providing fluid communication between the ports of the pump and motor in a fluid loop system. This valve plate structure can be incorporated into the transmission case which supports the other components of the pump and motor so a very compact transmission package is obtained.

BRIEF DESCRIPTION OF THE DRAWINGS

FIG. 1 is a section of the novel transmission, showing the mounting of the cylinder blocks of the pump and motor on a unitary valve plate structure; and FIG. 2 is a plan view of the valve plate structure, with parts broken away, showing the internal manifolds with broken lines.

DESCRIPTION OF A PREFERRED EMBODIMENT

The novel hydrostatic transmission, shown in FIG. 1, includes a hollow case 11 closed at one end by a bellhousing 12 by which the transmission can be mounted directly to an engine and closed at the opposite end by a common valve plate structure 13. With the bellhousing attached to the case with bolts 14 and a valve plate structure similarly attached with bolts 15, a closed, common compartment is provided for the pump and motor of the transmission.

Within this closed compartment cylinder block 20 of the pump and cylinder block 21 of the motor are mounted in a parallel side-by-side relationship so their valve ends 22 will rotate against an associated valve face 23 on the common valve plate structure when these cylinder blocks are supported for rotation on their respective shafts. Normally, each valve face 23 includes a pair of kidney-shaped ports 24 which alternately communicate with the circular array of cylinder ports (not shown) located in the valve end of each cylinder block in a conventional manner. The valve face may be milled directly into the valve plate structure or be a separately fabricated item attached to the valve plate structure with dowels. In addition, the valve face can include hydrostatic bearings and port modification to the kidney-shaped ports to reduce hammer, both of which are conventional techniques and therefore not shown in detail.

When the pistons 25 reciprocate in their associated bores within their respective cylinder blocks, fluid will enter or be discharged from the bores through one or the other kidney-shaped ports, depending on the direction of their travel and the piston location relative to the kidney-shaped ports. This is a common operating characteristic of conventional axial-piston-type pumps and motor employed with the instant invention. Since both the cylinder blocks for the pump and motor are mounted on the common valve structure 13, an internal or built-in manifold structure for the circulation of fluid under pressure between the kidney-shaped ports of the pump and motor can be employed. This manifold has a passage 26 which connects one of the kidney-shaped ports of the pump with one of the kidney-shaped ports of the motor and another passage 27 which connects the opposite kidney-shaped port of the pump with the opposite kidney-shaped port of the motor to form the hydrostatic loop for the circulation of fluid under pressure.

A number of advantages are gained by using the unitary valve plate structure with the internal manifold, such as the elimination of external high pressure lines, fittings and the like, the reduction of leakage and a reduction in the effects of pressure and thermal distortions within the transmission. In addition, the common compartment facilitates close mounting of the pump and motor units since it serves as a common housing and sump for both units so the leakage from either drains to the common reservoir at the bottom of case 11. In addition, the side-by-side mounting of cylinder blocks on the common valve plates allows the fabrication of a very compact package which is more economical than the co-axially aligned units and which is much easier to service.

Normally, the input shaft 30 carries the pump cylinder block 20 keyed thereto and extends between valve plate structure 13 and the bellhousing 12 being journaled with tapered bearing assemblies 31 at each end. A projecting stub shaft 32 extends through the bellhousing and is received in a splined sleeve 33 bolted to a flywheel 34 mounted on the crank shaft of the engine (not shown) and couples the pump unit for direct drive by the vehicle engine. The input shaft passes through an aperture in an adjustable swashplate 35 which is mounted on a trunion assembly adjacent to the pump cylinder block. During changes in the angular position of the swashplate, the displacement of the pump is varied in volume and/or direction in a conventional manner so transmission speed can be controlled in a forward or reverse direction. A thrust ring 36 having a plurality of socket pads 37 which receive the ball connectors of the pistons 25 extending from the pump cylinder block, tracks on the swashplate on a suitable bearing structure and rotates with the cylinder block when the shaft 30 turns, generally being connected to be driven by the input shaft, while the swashplate remains stationary, supported by its trunions.

An output shaft 40 is mounted parallel to the input shaft being journaled similarly at its end in the valve plate structure and bellhousing with tapered bearing assemblies 41. A splined stub 42 of the output shaft extends through the valve plate structure 13 and projects a short distance beyond. Through a final drive train connected to the output shaft, the vehicle is powered through the transmission unit. The motor cylinder block is keyed to the output shaft which passes through an aperture in a fixed bearing block 43 which rotatably supports thrust ring 44 containing a plurality of sockets pads 45 for receiving the ball ends of the pistons 25 of the motor unit. This bearing block maintains the thrust ring at a fixed angular position but could be replaced by an adjustable swashplate similar to that employed with the pump unit, if the speed range of the transmission is increased by reducing the displacement of the motor unit.

When using the above described common valve plate structure, auxiliary pumps, such as charge pump 50 can be mounted on the outside of the valve plate structure and powered by a shaft 51 extending through the valve plate and connecting with input shaft 30. The 180° apart orientation is possible by taking the output shaft out through the valve plate structure in a unique manner not possible with other type of constructions.

Also the common valve plate structure provides secondary passages 60 and 61 which communicate with internal passages 26 and 27 respectively and lead directly to a relief and replenishing valve group 62 which can be mounted directly on a valve plate assembly without any external fittings or pipings.

A control valve and linkage 70 is driven by a lever 71 which, through a link 72, connects to an arm 73 of the swashplate 35 which is pivotally supported by a trunnion assembly. Reciprocation of the arm as the angle of the swashplate changes relative to the pump cylinder block provides the follow-up signal in the servo control system. The ram system positioning swashplate is not shown, but the Hann patent referred to below illustrates such a ram system and the trunnion mount. Reference is made thereto to illustrate these conventional structures.

A conventional shuttle valve, low pressure relief and overpressure relief valves as shown in U.S. 3,212,263 issued to Hann, are connected in the fluid loop through passages 60 and 61 in a normal manner. Since such components are old in the art they are not shown or discussed herein.

We claim:

1. A compact hydrostatic transmission for lift trucks comprising:
  a cylindrical hollow case having one end closed by a bell housing and the opposite end closed by an end plate, said end plate having two integral valve plates formed therein, each valve having two arcuate ports;
  an axial-piston pump assembly having its cylinder block rotatably mounted on one of said valve plates to cooperate with its arcuate ports and having its adjustable piston drive assembly journalled in said bell housing whereby said hollow case, bell housing and end plate form a housing for the components of said axial-piston pump assembly;
  an actuator mounted on said hollow case and linked to said adjustable piston drive assembly to vary the displacement of said axial-piston pump assembly;
  an input shaft projecting through said bell housing and connected to said axial-piston pump assembly, said input shaft coaxial with the rotational axis of said pump cylinder block;
  an auxiliary mounted pump on said end plate and having a shaft extending therethrough which is coaxial and connected to said input shaft whereby hydraulic pressure will be available when the axial-piston pump assembly has zero displacement with rotation of said input shaft;
  an axial-piston motor assembly having a cylinder block rotatably mounted on the other valve plate to cooperate with its arcuate ports and having its fixed displacement piston drive assembly journalled in said bell housing whereby said hollow case, bell housing and end plate also form a housing for the components of said axial-piston motor assembly;
  an output shaft projecting through said end plate and connected to said axial-piston motor assembly, said output shaft coaxial with the rotational axis of said motor cylinder block; and
  separate passage means integrally formed in said end plate whereby hydraulic fluid can circulate between the arcuate ports of said two valve plates during power transfer through the transmission.

References Cited

UNITED STATES PATENTS 3,074,296    1/1963    Ebert.
3,123,975    3/1964    Ebert.
3,360,933    1/1968    Swanson et al.

EDGAR W. GEOGHEGAN, Primary Examiner

U.S. Cl. X.R.

103—161

UNITED STATES PATENT OFFICE

CERTIFICATE OF CORRECTION

Patent No. 3,486,335　　　　　　　　　　December 30, 1969

Richard J. Kern et al.

It is certified that error appears in the above identified patent and that said Letters Patent are hereby corrected as shown below:

Column 4, line 25, after "valve" insert -- plate --.

Signed and sealed this 22nd day of December 1970.

(SEAL)
Attest:

Edward M. Fletcher, Jr.　　　　　　　　WILLIAM E. SCHUYLER, JR.
Attesting Officer　　　　　　　　　　　　Commissioner of Patents